United States Patent [19]
Klein et al.

[11] Patent Number: 5,078,447
[45] Date of Patent: Jan. 7, 1992

[54] MULTI-POSITION RETRACTABLE VEHICLE ROOF

[75] Inventors: George W. Klein, Dearborn Heights; Robert A. Patterson, Garden City; Chad Himes, Brighton, all of Mich.

[73] Assignee: C&C Incorporated, Brighton, Mich.

[21] Appl. No.: 511,862

[22] Filed: Apr. 10, 1990

Related U.S. Application Data

[63] Continuation-in-part of Ser. No. 463,769, Jan. 12, 1990, abandoned.

[51] Int. Cl.⁵ .............................................. B60J 7/04
[52] U.S. Cl. .................................... 296/107; 296/110
[58] Field of Search ................. 296/107, 110, 117, 216

[56] References Cited

U.S. PATENT DOCUMENTS

| | | | |
|---|---|---|---|
| 4,729,592 | 3/1988 | Tuchiya et al. | 296/107 |
| 4,786,102 | 11/1988 | Sakamoto | 296/216 |
| 4,796,943 | 1/1989 | Fukutomi et al. | 296/107 |
| 4,895,409 | 1/1990 | Konishi et al. | 296/107 |

Primary Examiner—Robert R. Song
Attorney, Agent, or Firm—Edgar Zarins; Malcolm L. Sutherland

[57] ABSTRACT

A multi-position hardtop roof for a vehicle which is retractable between a coupe position enclosing the passenger compartment and a convertible position wherein the roof is stored within the rear deck of the vehicle. The roof is segmented into a front fixed panel incorporating the windshield, an intermediate panel and a rear panel. The intermediate panel of the roof is telescopically retractable onto the rear panel and both movable panels are thereafter retractable into the rear deck of the vehicle. From the coupe position, the intermediate roof segment can be tilted to a second venting position. Further retraction moves the intermediate segment rearwardly onto the rear roof segment to a targa position. Finally, the roof segments may be fully retracted to the convertible position. Two sets of piston/cylinder mechanisms control movement of the intermediate segment and the rear roof segment. The longitudinal retraction and the segmented construction of the roof facilitate retraction even while the vehicle is moving and minimizes the storage space required for the fully retracted roof.

34 Claims, 8 Drawing Sheets

_Fig-4A_

_Fig-9_

_Fig-11_

MULTI-POSITION RETRACTABLE VEHICLE ROOF

This is a continuation-in-part of co-pending application Ser. No. 07/463,769 filed on Jan. 12, 1990, abandoned.

BACKGROUND OF THE INVENTION

I. Field of the Invention

This invention relates to retractable roofs for vehicles and, in particular, to a segmented hardtop roof for a vehicle which may be retracted through four positions to expose the passenger compartment of the vehicle.

II. Description of the Prior Art

Convertible-type vehicles have been popular for allowing the driver and passengers to experience open air driving while having the capability of enclosing the passenger compartment during cold or wet weather. The most common means of exposing the passenger compartment utilizes a mechanically retractable fabric top which is stored at the rear of the passenger compartment to expose the entire passenger area. The fabric material from which the retractable roofs are manufactured provides little insulation to the passenger compartment during cold periods leading to discomfort for the passengers. The fabric roof is also subject to break-ins since the material can be easily cut.

In an attempt to provide the insulative protection of hardtop vehicles while giving the "wind through your hair" feeling of conventional convertibles, various alternative roof styles were developed which included T-top roofs and sunroofs. The T-top vehicles incorporated a pair of removable panels in the vehicle roof directly above the driver and the front seat passenger. The panels are made of glass or metal to match the contour of the vehicle roof. Upon removal of the panels the front seat passengers would have the feeling of open air driving although the rear portion of the roof would remain intact. A cross support extending between the windshield and the rear portion of the roof provides support for the panels while maintaining the strength of the roof.

Sunroof assemblies provide partial opening of the vehicle roof in order to increase ventilation while also providing the roof with a somewhat convertible-like capability of opening the vehicle occupant compartment. With some sunroof assemblies, the sunroof panel has a front edge that is secured to the roof and a rear edge that is movable upwardly to an open ventilating position under the control of a latch mechanism. Other sunroof assemblies are mounted for longitudinal movement between a forward position closing the roof opening and a rearwardly retracted position such that the roof is partially opened to the environment.

While both the T-top and sunroof assemblies provide some ventilation to the passenger compartment, neither is entirely satisfactory in providing the open air driving of the conventional convertible. Nevertheless, the conventional convertible tops are limited by environmental extremes which can lead to discomfort for the passengers.

SUMMARY OF THE PRESENT INVENTION

The present invention overcomes the disadvantages of the prior known vehicle constructions by providing a hardtop vehicle roof which is retractable through four positions to expose the passenger compartment by varying degrees while also providing the advantages of a hardtop vehicle roof.

The vehicle roof of the present invention is segmented and retractable from a fully closed position enclosing the passengers from the environment to a fully retracted position to provide the vehicle with a convertible-like configuration. In a preferred embodiment of the vehicle, the roof is movable through four positions: a first fully closed "coupe" position; a second "sunroof" position having the intermediate roof segment tilted upwardly for ventilation; a third "targa" position wherein the intermediate roof segment is retracted rearwardly onto the rear roof segment; and a fourth "convertible" position wherein the intermediate and rear segments retract into the rear deck of the vehicle to fully expose the passenger compartment. In accordance with the invention, the driver and passengers may expose the interior compartment commensurate with weather conditions and passenger comfort. The individual segments of the roof may be manufactured of fabric, plastic, glass or metal depending upon the desired degree of exposure of the passenger compartment.

The underlying mechanics of the roof system allows the roof to be clearly and compactly retracted and stored under the rear deck without sacrificing a substantial portion of the rear trunk storage space as in prior known retractable hardtop roofs. Moreover, the angular displacement and position of the roof segments allows retraction even as the vehicle is travelling which was not permitted with early retractable hardtops or soft-top convertibles. A pair of telescoping siderails facilitate retraction of the intermediate roof segment onto the rear segment. In the coupe and venting positions, the telescoping side rails are fully extended to lockingly engage the front or windshield segment of the roof. A number of pivotable lever lift mechanisms associated with each side rail sequentially lift the intermediate segment to the venting position and raise the intermediate segment for retraction above the rear roof segment. Upon retraction to the targa position, the side rails are telescopically retracted until the intermediate roof segment is positioned over the rear segment. Finally to fully retract the roof, the rear segment having the intermediate segment piggy backed thereon is lowered under the rear deck in height. In the preferred embodiment of the invention the interior surface of the rear quarter panels including guide rails which control the retraction of the rear roof segment. The rail receives support arms attached to the rear roof segment and travel along the rails. In a preferred embodiment of the present invention, the retraction of the vehicle roof is controlled by a prelubricated felt push/pull cable attached to the intermediate segment via a lift mechanism and side rail. A standard set of cylinders are attached to the rear roof segment and control movement of the roof in accordance with the configuration of the interior guide rails. A cable guide is formed into the fixed portion of the telescoping side rail associated with the rear roof segment. The push/pull cable guided by the fixed portion of the telescoping side rail is secured to the lift mechanism associated with the rail of the intermediate roof segment in order to control the pivoting motion of the lift mechanism as well as the retraction of the intermediate roof segment above the rear roof segment. The cable guide formed into the outer of the telescoping rails guides the push/pull cable as the motor pulls these cables. A resistance mechanism controls the position of the telescoping side rail so as the initial reaction is the pivoting of the rear lift mechanism thereby angling the roof panel to the vented position. Further pull of the cable will engage the front lift mechanism to raise the entire roof segment for retraction over the rear segment. Continued pulling of the cable will retract the telescoping rails and the intermediate roof segment rearwardly to the targa position. During the extension of the rails to the closed position, a safety mechanism associated with the lift mechanism levers and side rails prevents the levers from collapsing until the intermediate roof segment is fully extended into engagement with the front roof segment or windshield thereby ensuring that the intermediate roof panel is properly positioned before it is collapsed to the coupe position.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Referring first to FIG. 1 through 4, there is shown a vehicle 10 with a vehicle body 12 and a passenger compartment 14. The passenger compartment 14 is selectively enclosed by a vehicle roof 16 embodying the present invention and selectively retractable through multiple roof positions to provide varying degree of exposure to the passengers within the vehicle compartment 14. In a preferred embodiment, the vehicle roof 16 is selectively movable between a coupe position (FIG. 1) wherein the passenger compartment 14 is completely enclosed and a retracted convertible position (FIG. 4) fully exposing the passenger compartment 14. However, it is to be understood that retraction of the roof 16 may be limited to a targa position (FIG. 3), wherein only an intermediate portion of the passenger compartment 14 is exposed with no roof structure whatsoever over the front seat passengers, using the underlying structure of the present invention.

Figure 1:
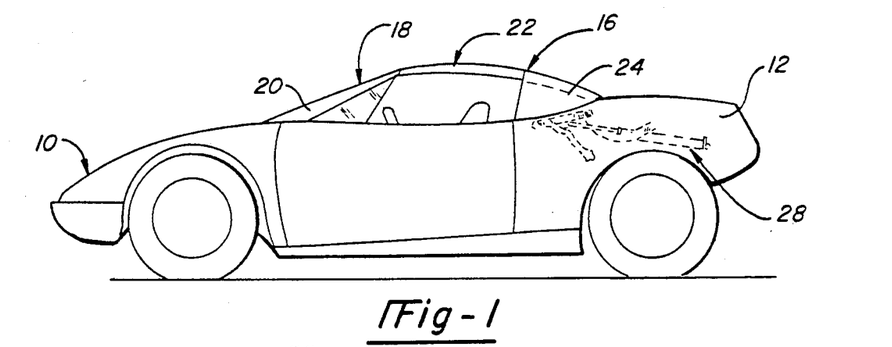
FIG. 1 is a side view of vehicle incorporating the multi-position retractable vehicle roof embodying the present invention with the roof in the coupe position.
Figure 2:
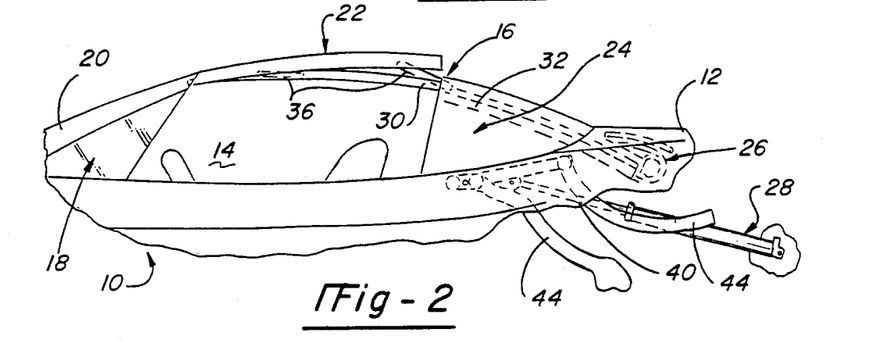
FIG. 2 is a partial side view of the upper section of the vehicle showing the roof in the vented position.
Figure 3A:
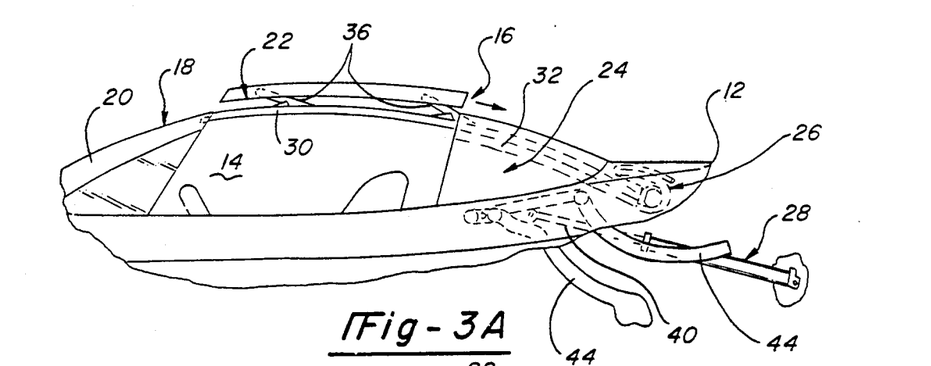
FIG. 3a is a partial side view of the upper section of the vehicle showing intermediate segment of the roof raised for rearward movement.
Figure 3B:
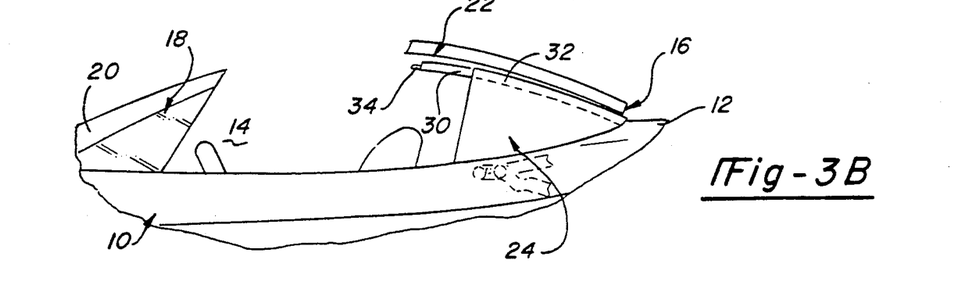
FIG. 3b is a partial side view of the upper section of the vehicle showing the roof in the targa position.

The vehicle roof 16 is preferably segmented comprising a fixed front header 18 substantially formed by the vehicle windshield 20 and any windshield frame, an intermediate roof panel 22, and a rear roof section 24. The intermediate roof panel 22 and the rear roof section 24 are independently retractable to move the roof 16 through its multiple positions. In the coupe position (FIG. 1) the intermediate roof panel 22 is extended to lockingly engage the front header 18. The rearward edge of the intermediate roof panel 22 can be tilted upwardly while the telescoping rail maintains contact with the front header 18 to move the roof 16 to the vented position (FIG. 2) similar to many conventional sunroofs. The intermediate portion of the passenger compartment 14 can be exposed by fully raising the intermediate roof panel 22 (FIG. 3a) and retracting the roof panel 22 rearwardly until it is juxtapositioned over the rear roof section 24 thereby providing the vehicle 10 with a targa configuration (FIG. 3b). Finally, both the rear roof section 24 and the juxtaposed intermediate roof panel 22 can be retracted downwardly and rearwardly (FIG. 4a) for storage within the rear deck of the vehicle body 12 thereby providing a fully exposed convertible position (FIG. 4b) to the vehicle passenger compartment 14.

The segmented configuration of the vehicle roof 16 facilitates retraction through the multiple positions over a lower profile than previous retractable hardtop roofs such that the roof 16 can be moved to any of the four preferred positions even while the vehicle 10 is moving. The structure which allows retraction includes first means 26 for retracting the intermediate roof panel 22 and second means 28 for retracting the rear roof section 24. In a preferred embodiment, the retraction means comprises a cable drive system to control movement of the roof 16 although other means may be substituted such as direct drive means. Included as part of the first retraction means 26 is a telescoping rail assembly which permits the retractable roof panels to move into nesting juxtaposition. The intermediate roof panel 22 is supported by side supports 30 extending along both sides of the passenger compartment 14. The side supports 30 are telescopically received by the rear roof section 24 and more specifically by corresponding side channels 32 formed in the rear roof section 24 which guide the telescoping movement of the side supports 30. In the fully extended position, the side supports 20 engage the fixed front header to form a continuous roof surface. The side supports 20 preferably include location pins 34 to properly align the intermediate roof panel 22 with the front header 18. When the intermediate roof panel 22 is retracted rearwardly the side supports 20 telescopically retract into the rear roof section 24 thereby removing all vehicle structure from the intermediate portion of the passenger compartment 14. This is different from retractable sunroofs which maintain guide rails or support structure along the side edges of the vehicle roof. In the present invention, the intermediate roof panel 22 is connected to the side supports 30 by a lever system 36 which will be described in greater detail herein. In a preferred embodiment, the lever system 36 is actuated by the first retraction means 26.

Figure 4A:
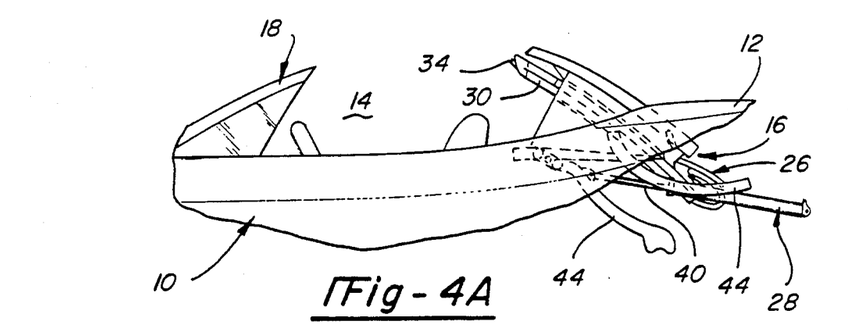
FIG. 4a is a partial view of the upper section of the vehicle showing the intermediate segment above the rear roof segment and in the process of storing below the rear deck.
Figure 4B:
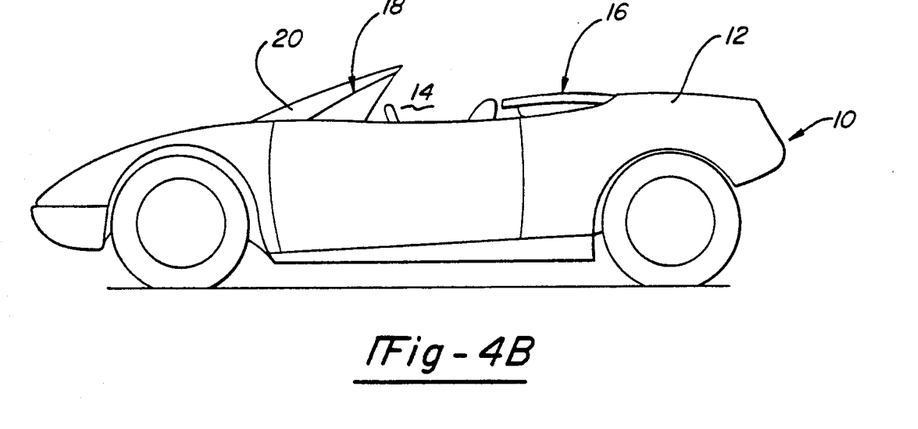
FIG. 4b is a side view of a vehicle incorporating the multi-position retractable vehicle roof in the convertible or stored position.
Figure 5:
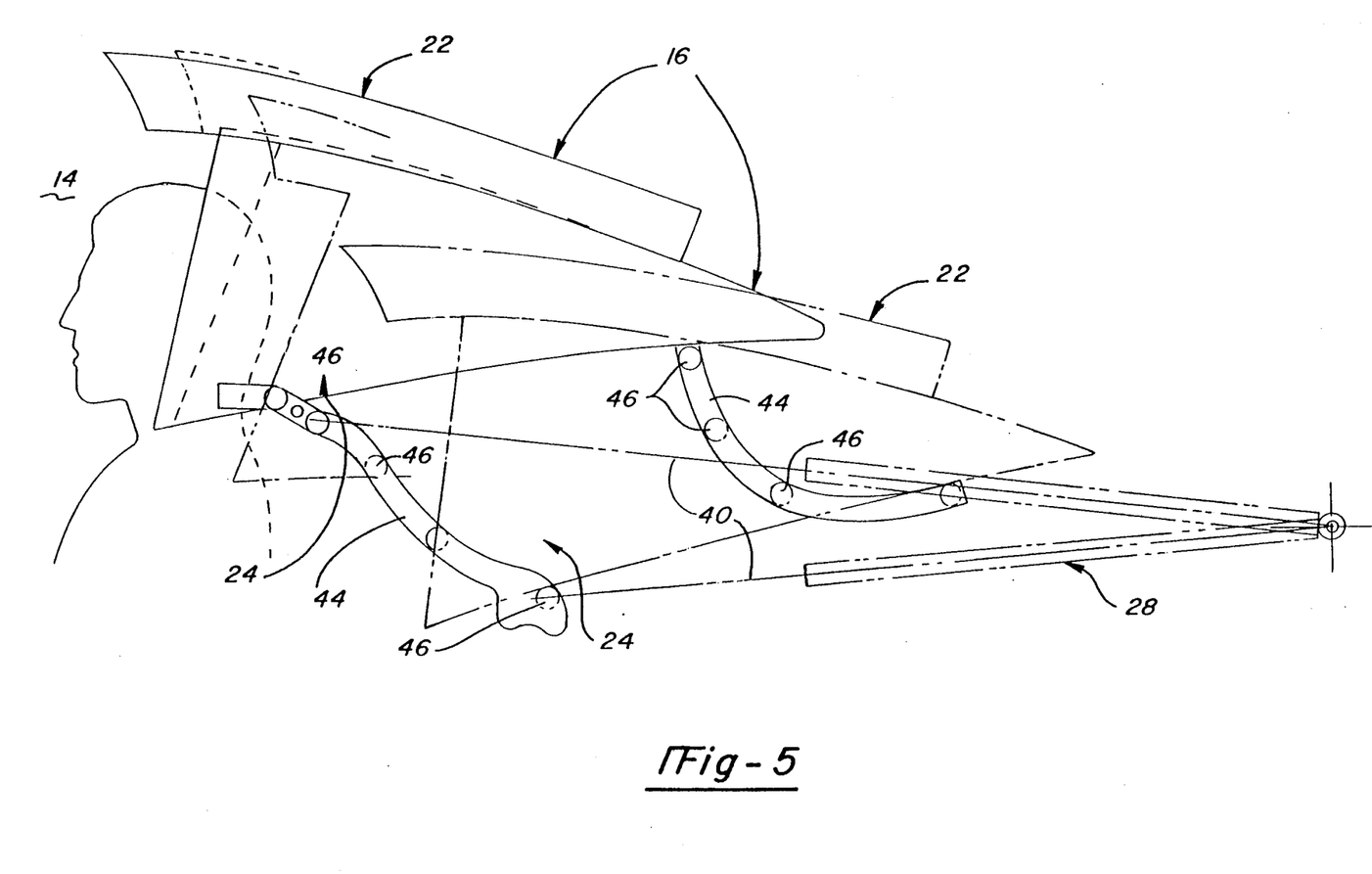
FIG. 5 is a schematic side view showing the retraction movement of the rear and intermediate roof segments from the targa position to the fully stored convertible position.
Figure 13:
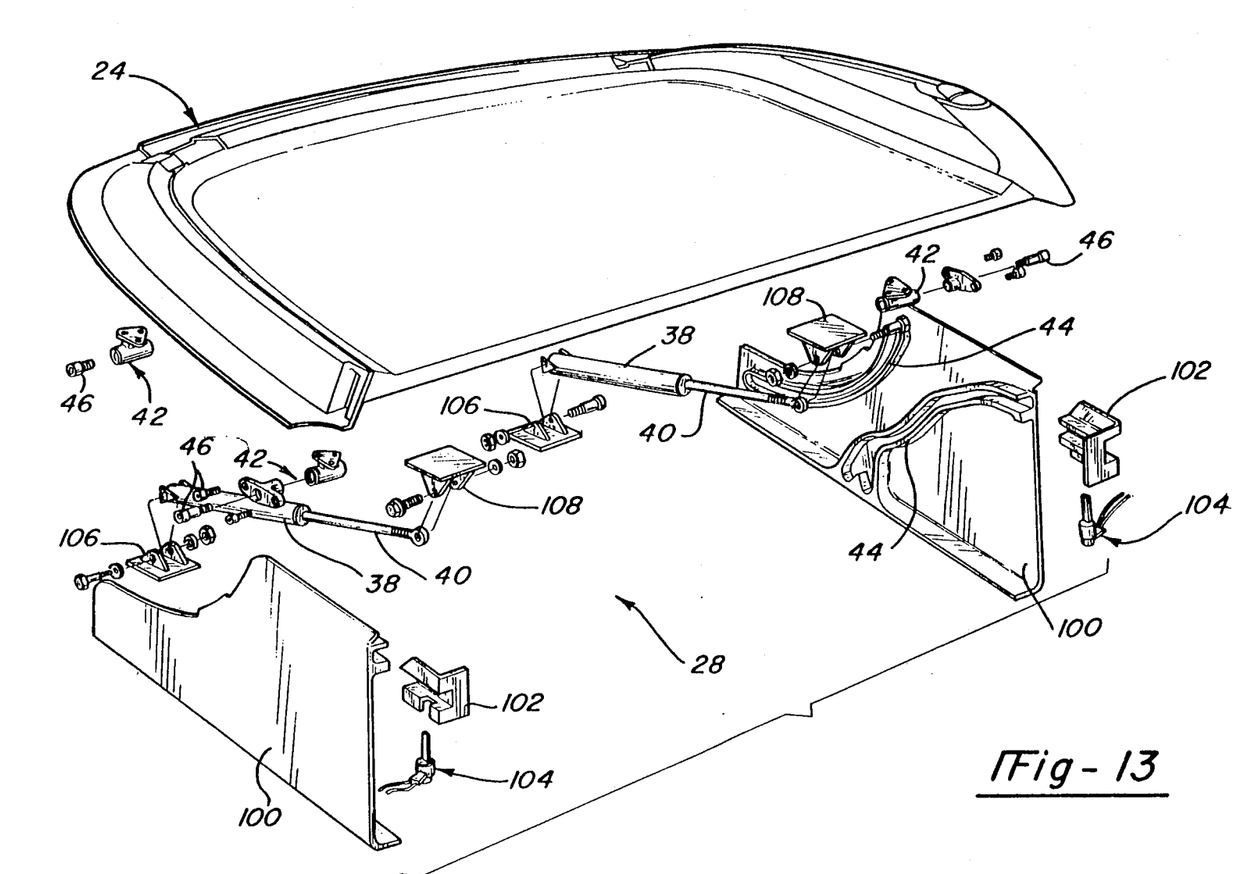
FIG. 13 is an exploded view of the hydraulic drop system including locking solenoids to retain the rear roof segment in the up position.

The second retraction means 28 is associated with the rear roof section 24 and controls the movement of the rear section 24 and intermediate panel 22 between the targa and convertible positions. Referring now to FIGS. 4, 5 and 13, the second retraction means 28 preferably comprises a cylinder 38 having a piston rod 40 extending therefrom and connected to the rear roof section 24 to control the motion thereof. The rear roof section 24 includes side support arms 42 which extend outwardly from the sides of the rear roof section 24 to engage corresponding guide tracks 44. The guide tracks 44 are configured to control the motion of the rear roof section 24 such that it is tucked down into the rear deck of the vehicle 10. In a preferred embodiment, a pair of front guide tracks and a pair of rear guide tracks are formed in the body of the vehicle 10. The support arms 42 are provided with rollers 46 which travel within the guide tracks 44 as will be described in greater detail.

Figure 6:
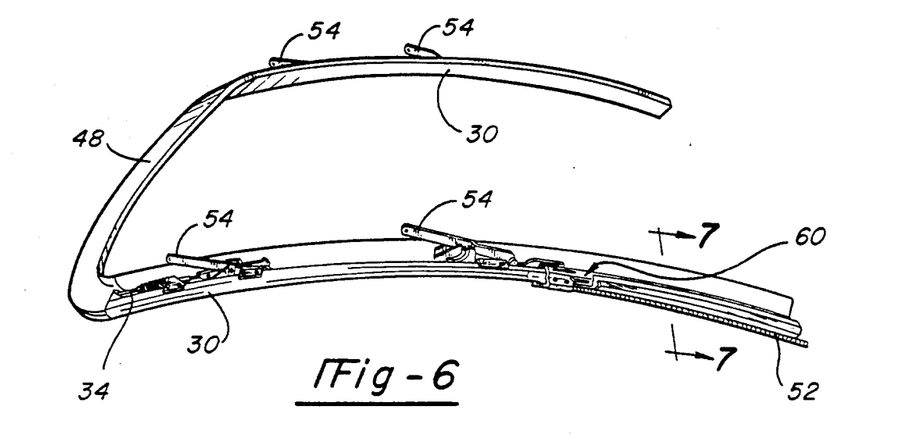
FIG. 6 is a perspective view of the inner telescoping side rails with the locations of the lift mechanisms with levers, lock mechanism and resistance mechanism.
Figure 7:
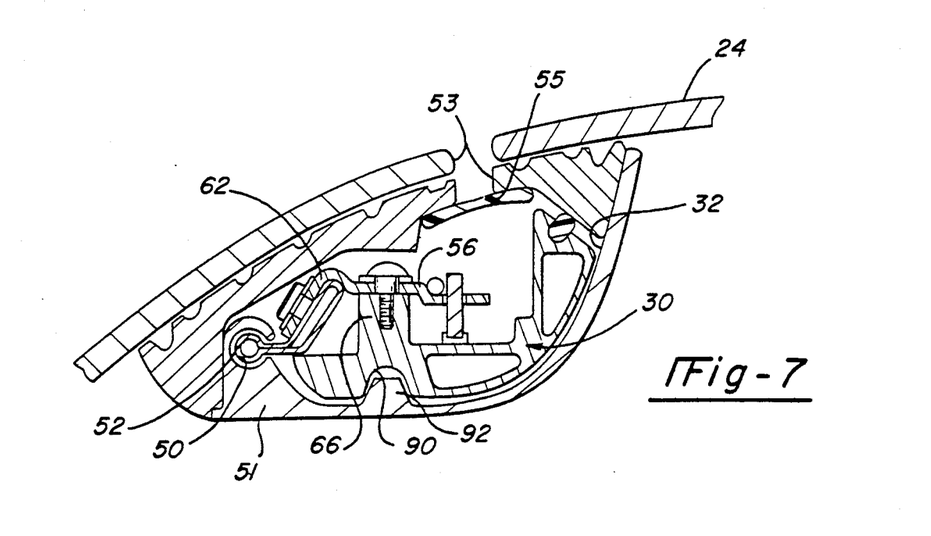
FIG. 7 is a transverse cross-section through the telescoping side rail along lines 7—7 of FIG. 6 showing the cable attachment to the resistance member of the side rail.
Figure 11:
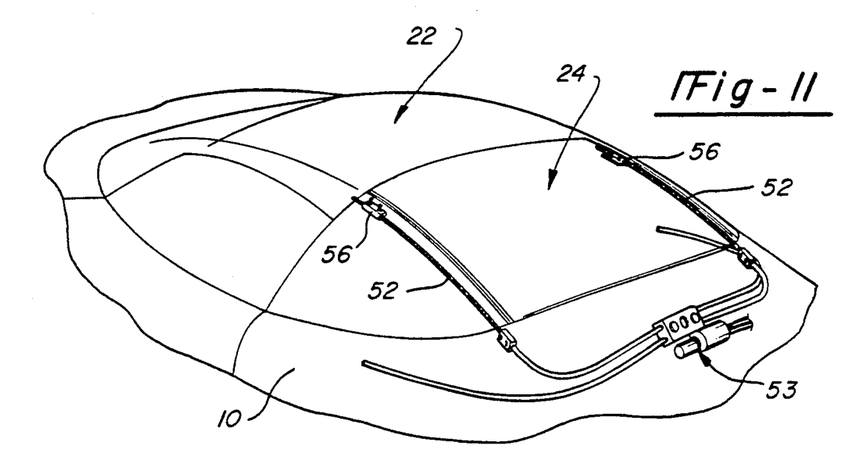
FIG. 11 is a perspective view of the vehicle showing the cable drive system for telescoping the intermediate roof segment.
Figure 12:
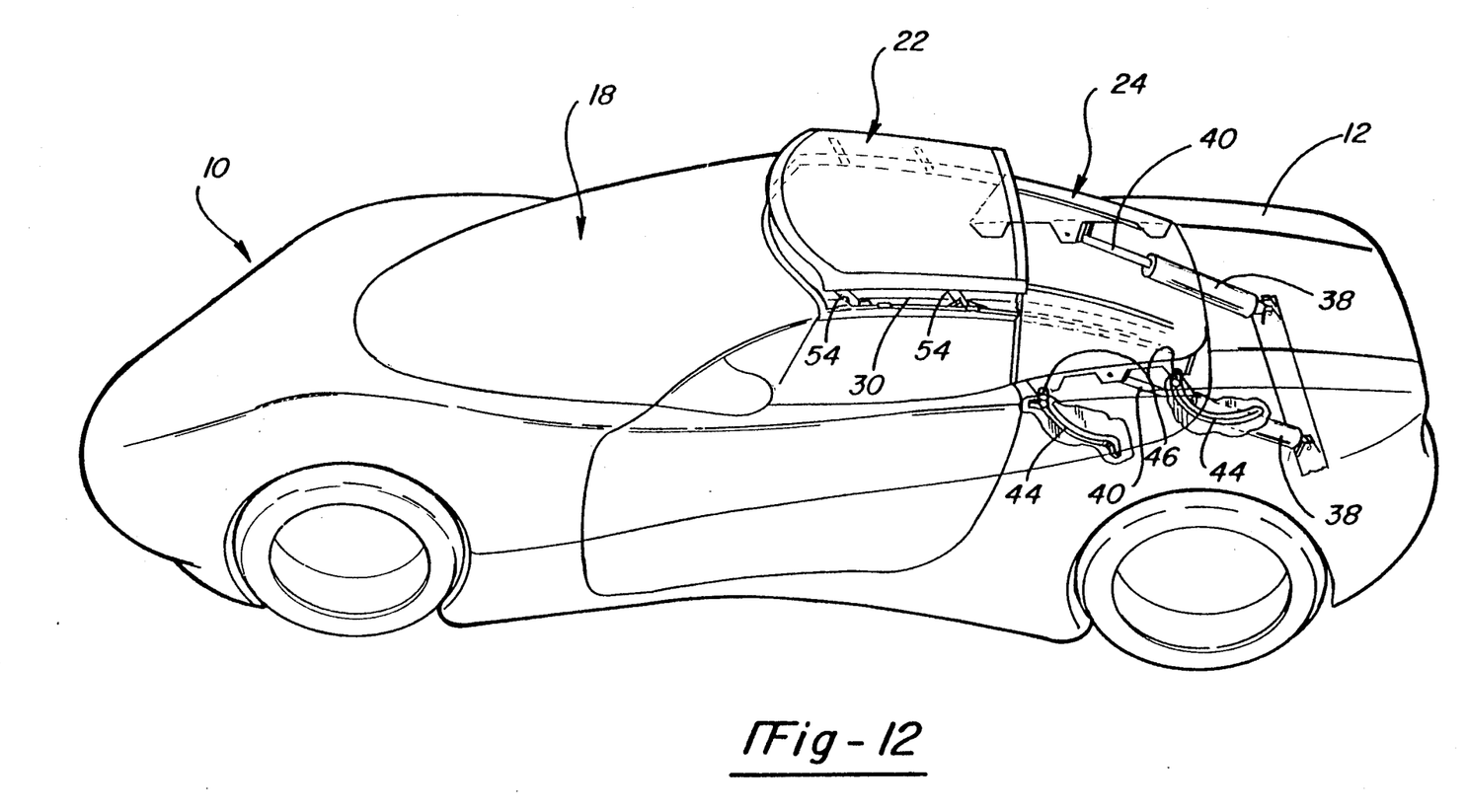
FIG. 12 is an elevated perspective of the vehicle with the retractable vehicle roof of the present invention.

Referring now to FIGS. 6 through the side supports 30 and the channels 32 control the retraction movement of the intermediate roof panel 22 relative to the vehicle body 12. The side supports 30 extend longitudinally along the outboard edges of the vehicle roof 16 and may include a retractable header 48 connecting the front ends of the supports 30. The channels 32 and side supports 30 are similarly configured such that the channels 32 guidingly support the side rails 30 particularly in the extended position. The channels 32 include a cylinder 50 extending the length thereof and receiving a cable 52 which travels within the elongated cylinder 50. The cables 52 are secured to the side supports 30, more particularly the lever system 36, such that as the cable 52 is telescopically retracted through the cylinder 50, the side supports 30 are telescopically retracted into the channels 32. Likewise, as the cable 52 is extended through the cylinder 50, the side supports 30 will be extended. The cables 52 are connected to a drive mechanism 53 mounted within the rear of the vehicle 10 as shown in FIG. 11. In a preferred embodiment, the channels 32 include a lower guide rail 51 within which the elongated cylinder 50 is formed and which forms a part of the channel 32 formed within the rear roof section 24. The channel 32 includes an upper slot 53 extending substantially the length of the channel 32 through which the levers 54 travel as the intermediate roof panel 22 is retracted into juxtaposition with the rear roof section 24. Preferably the slot 53 includes a wiper seal 55 to prevent rain and grime from entering the channel 32.

Figure 8:
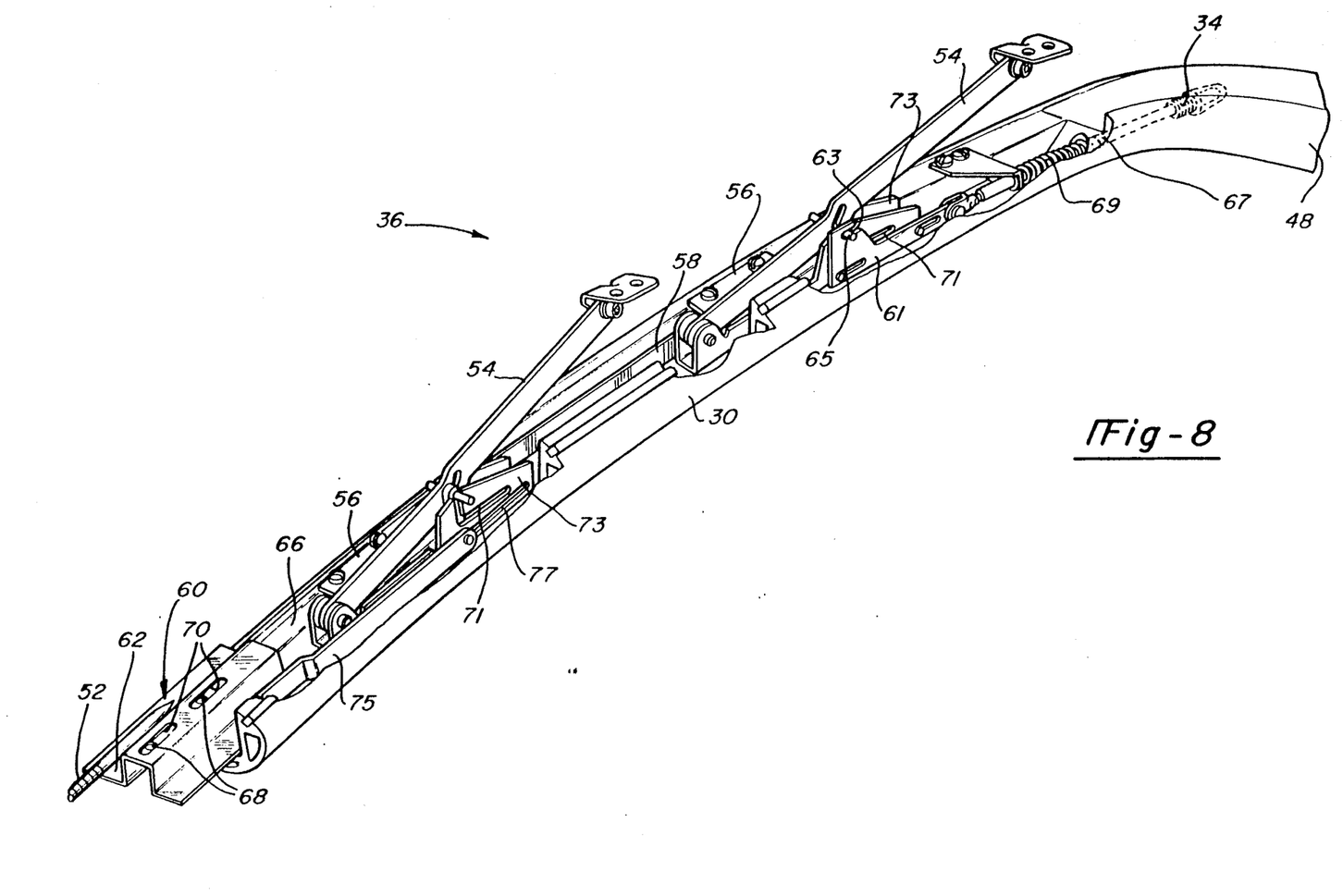
FIG. 8 is a perspective view of the first embodiment of the lift mechanism associated with the telescoping side rail of the roof.

Mounted to the side supports 30 is a lever system 36 comprising a pair of pivotable levers 54 actuably mounted to each side supports 30. The ends of the levers 54 are attached to the intermediate roof panel 22 in order to raise and lower the intermediate roof panel 22 as will be subsequently described. The levers 54 of each side support 30 are mounted within a receiving bracket 56 fixedly secured to the support 30. The brackets 56 are interconnected by a power link 58 which facilitates synchronized actuation of the connected levers 54. The actuation bar 58 is connected to a slide bracket 60 associated with the rearward lever 54 to which is connected the cable 52 using mounting plate 62. The slide bracket 60 is slidably mounted to a central ridge 66 of the support 30 using a pair of screws 68 extending through slots 70 of the slide bracket 60. The slots 70 allow the slide bracket 60 to move along the ridge 66 a predetermined distance in order to raise and lower the levers 54. Sliding motion of the bracket 60 in a first direction will raise the levers 54 while sliding motion in a second direction will lower the levers 54. The longitudinal motion of the slide bracket 60 is transferred to the second, forward lever 54 by the actuation bar 58. In a first embodiment of FIG. 8, a power link extends between the levers 54 to simultaneously control their actuation The forward lever 54 is received by lock-up plate 61 which includes slots 63 to receive a control pin 65 of the lever 54. The plate 61 is connected to a flexible cable 67 which acts as the locator pins 34 into the header 18. The cable 67 is biased outwardly by spring 69 which in turn biases the plate 61 forwardly causing the pin 65 of the lever 54 to remain within the slot 63 until the retractable header 48 engages the fixed header 18. This causes the locator pins 34 and cable 67 to be pushed against the bias of the spring 69 which in turn pushes the plate 61 allowing the lever 54 to move downwardly. Thus, the intermediate panel 22 cannot lower until the rails 30 are fully extended into contact with the header 18. The slots 63 also prevent the roof panel 22 from being pulled away from the rails 30 during retraction. Both levers 54 are guided by a slot 71 formed in guide brackets 73 forming a part of the bracket 56. The levers 54 are connected by the power link 58 while the rear lever 54 is in turn connected to the slide bracket 60 by link 75. The rear guide bracket 73 is also provided with lost motion slots 77 to permit the rear levers 54 to be raised without raising the front levers thereby positioning the intermediate panel 22 in the vented position.

Figure 9:
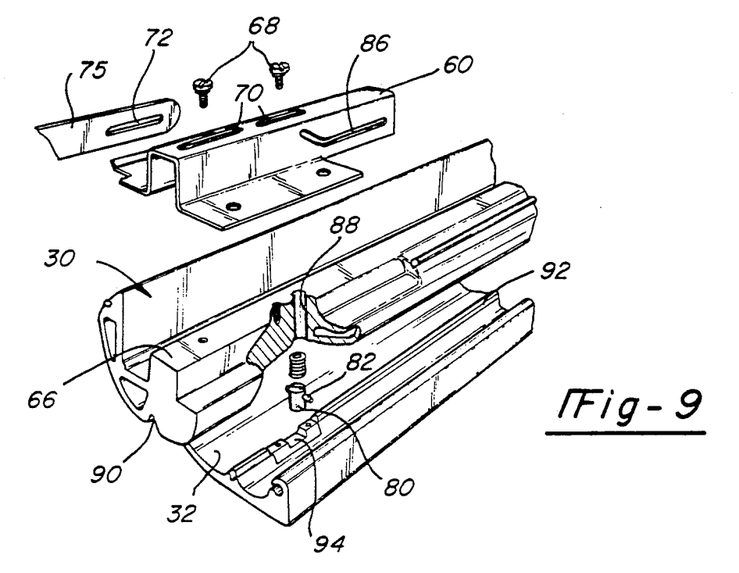
FIG. 9 is an exploded perspective of the resistance member of the list mechanism of FIG. 8.

Initial retraction of the main cable 52 will cause the slide bracket 60 to move rearwardly simultaneously pulling on the rear lever 54 to move it along the slot 71 in the fixed guide bracket 73 causing the rear lever 54 to extend upwardly moving the panel 22 to the vented position. Further retraction of the cable 52 will transmit through the power link 58. However, the lock-up plate 61 will prevent the front levers 54 from raising until the header 48 is retracted causing the cable 67 to extend under the bias of the spring 69 which in turn moves the plate 61 forward. At this point, the pin 65 will travel along the edge of the plate 61 into slot 63 thereby raising the front levers 54 to allow the intermediate panel 22 to be retracted into juxtaposition with the rear panel 24. As is best shown in FIG. 9, the supports 30 include a locking pin 80 which cooperates with groove 94 in the rail 32 and is controlled by the slide bracket 60 through slots 86 which receive pin 82. The locking pin 80 positively locks the roof in the extended position even when power is removed while also preventing premature retraction of the side supports 30 until the rear levers 54 have been raised. This prevents possible damage to the intermediate roof panel upon premature retraction.

Figure 10:
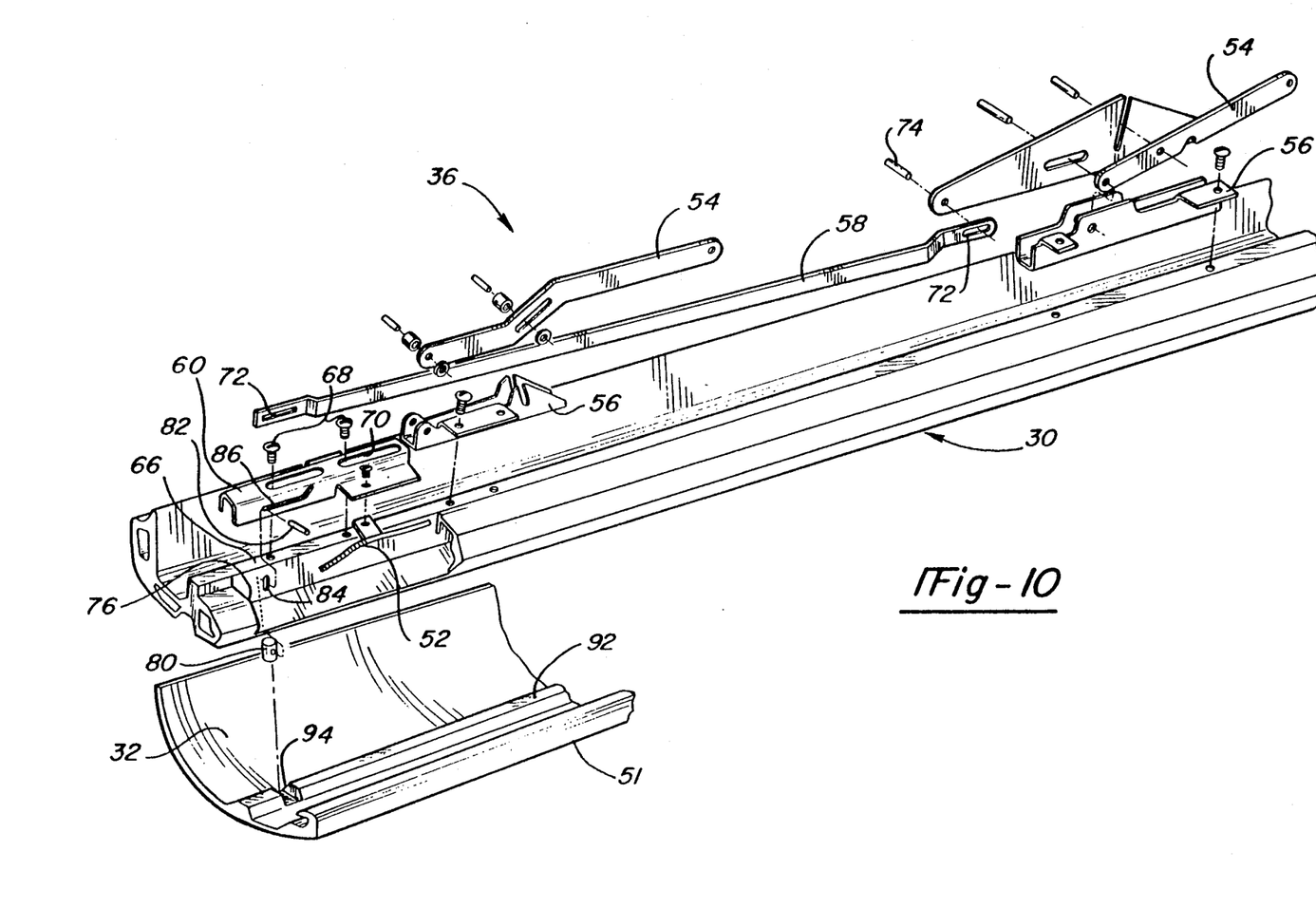
FIG. 10 is an exploded perspective of a second embodiment of the lift mechanism associated with the telescoping side rail of the roof.

In a second embodiment of the first retraction means shown in FIG. 10, raising of the intermediate roof panel 22 and its retraction are sequentially controlled. Since it is desirable to first raise the rearward lever 54 in order to tilt the rearward edge of the intermediate roof panel 22 upwardly, the power link 58 is provided with lost motion slots 72. As a result, shifting of the slide bracket 60 will raise the rearward lever 54 but the forward lever 54 will not be raised until the connecting pin 74 engages the end of the slot 72 thereby driving the forward lever 54 upwardly. Accordingly, initial actuation of the roof system will cause the slide bracket 60 to be pulled rearwardly by the cable 52 causing the rearward levers 54 to raise the rearward edge of the intermediate roof panel 22 (FIG. 2). Additional retraction of the slide bracket 60 will actuate the forward levers 54 raising the entire panel 22 (FIG. 3a) and causing the slide bracket 60 to abut a limiting shoulder 76 formed in the support 30 and the screws 68 to engage the ends of the slots 70. Still further retraction of the cable 52 will cause the side support to be drawn backwards into the channels 32. Extension of the cable 52 will sequentially reverse the operation of the supports 30 and lever system 36 to extend the intermediate roof panel 22 and lower the roof panel 22 onto the side supports 30 to the coupe position. In order to ensure proper sequential operation of the roof system, the lever system 36 and side supports 30 are provided with means for preventing lowering of the levers 54 until the side supports 30 are fully extended thereby preventing the intermediate roof panel 22 from being lowered prematurely. Disposed within the central ridge 66 of the side supports 30 is a vertically displaceable locking pin 80. The locking pin 80 includes lateral arms 82 which are received within vertical slots 84 formed in the ridge 66 and elongated slot 86 formed in the slide bracket 60. The elongated slot 86 is configured such that as the slide bracket 60 is moved backwards the locking pin 80 will be raised upwardly into aperture 88 in the ridge 66. The underside of the ridge 66 forms a channel 90 which travels along guide track 92 in the channel 32 of the rear roof section. Once the pin 80 has been raised the guide track 92 will prevent it from being lowered thus preventing the slide bracket 60 from moving forward. The locking pin 20 will not fall until it reaches a cut-out 94 formed in the guide track 92 at the point where the side supports 20 are substantially fully extended allowing the slide brackets 60 to move forwardly lowering the levers 54 and the intermediate roof panel 22.

FIG. 13 shows the second retraction means 28 in greater detail for retraction of the rear roof panel 24 and the juxtaposed intermediate panel 22 into the rear deck. The tracks 44 are preferably formed in a panel 100 which can be mounted within the interior of the vehicle. At least the forward tracks 44 are provided with extensions 102 which include solenoid locks 104 to lock the retraction means 28 in the fully extended or raised position thereby preventing the rear roof segment 24 from travelling down the tracks 44 in the event the hydraulic cylinders 38 fail. One end of the cylinders 38 is connected to the vehicle through bracket 106 while the piston rod 40 is connected to the rear roof panel 24 using bracket 108. Thus, as the piston rods 40 are telescopically extended and retracted, the rear roof panel 24 will travel along the tracks 44.

Operation of the roof system of the present invention provides controlled positioning of the vehicle roof 16 through four preferred positions (FIGS. 1-4). However, it is contemplated that the system could be adjusted to position itself at additional intermediate points or limited to eliminate any one of the positions described. In a preferred embodiment, the system would be fully automatic whereby the driver or a passenger would press a button within the passenger compartment corresponding to the desired position of the roof 16. Accordingly, the vehicle roof 16 will move to the chosen position and remain there until a different position is chosen. As an added feature, the roof 16 could automatically move to the closed position when the ignition is turned off. Beginning from the closed or coupe position (FIG. 1), initial actuation of the first retraction means will cause the cable 52 to be drawn rearward causing the slide bracket 60 to move backward raising the rearward levers 54 thereby moving the intermediate roof panel 22 to the vented position (FIG. 2). Further retraction of the cable 52 will fully shift the sliding bracket 60 until it abuts the shoulder 76 thereby raising not only the forward edge of the intermediate roof drawn into the rear roof section 24 and specifically the side channels 32 thereof until the intermediate roof panel 22 is fully retracted into juxtaposition with the rear roof section 24 (FIG. 3b) positioning the roof 16 in the targa position. With the first means fully retracted, the second retraction means must now be engaged to further retract the roof 16.

The cylinders 38 of the second retraction means 28 retract the piston rods 40 which draws the rear roof section 24 and its piggybacked intermediate roof section 22 rearwardly. The guide tracks 44 control the motion of the rear roof section 24 tucking the roof 16 down into the rear deck of the vehicle 10. In accordance with the configuration of the tracks 44 the rearward end of the rear roof section 24 will move downwardly before the front end thereby allowing it to be compactly stored within the vehicle body 12. The rollers 46 travel within the tracks 44 to provide smooth operation.

Closing up the passenger compartment results from a mere reversal of the retraction motion. The piston rods 40 of the second retraction means 28 are extended from the cylinders 38 to push the rear roof section along the tracks 44 from the convertible position (FIG. 4) to the targa position at which point the solenoid locks 104 will secure the rear roof panel 24. Thereafter, the first retraction means 26 takes over extending the cable 52 which in turn operates on the side supports 30 to extend the intermediate roof panel 22 away from the rear roof section 24. It should be noted that because the locking pin 80 cannot move downwardly the slide bracket 60 is prevented from shifting forward until the locking pin 80 drops down into the cutout 92 of the channels 32. Once the side supports 30 are fully extended and the locator pins 34 engage the fixed header 18, the locking pin 80 will drop down allowing the slide bracket 60 to be shifted forward lowering the levers 54 and the intermediate roof panel 22 to fully enclose the passenger compartment 14.

The foregoing detailed description has been given for clearness of understanding only and no unnecessary limitations should be understood therefrom as some modifications will be obvious to those skilled in the art without departing from the scope and spirit of the appended claims.

We claim:

1. A multi-position roof for a vehicle having a passenger compartment, said vehicle roof comprising:

at least one rigid roof panel detachably secured to a fixed front portion of the vehicle and means for longitudinally retracting said at least one rigid roof panel rearwardly from said fixed front portion to expose the passenger compartment, said at least one rigid roof panel including side supports rearwardly retractable from said front vehicle portion to rearwardly retract said at least one rigid roof panel exposing the passenger compartment.

2. The vehicle roof as defined in claim 1 wherein said at least one roof panel including an intermediate roof segment and a rear roof segment, said intermediate roof segment attached to said retractable side supports, said side supports retractably received by said rear roof segment.

3. The vehicle roof as defined in claim 2 wherein said rear roof segment includes side channels for telescopically receiving said side supports of said intermediate roof segment, said side channels of said rear roof segment having an upper longitudinal slot.

4. The vehicle roof as defined in claim 3 wherein said intermediate roof segment is attached to said side supports by at least one selectively pivotable lever mounted to each side support, said at least one pivotable lever selectively moving said intermediate roof segment between a lowered position and a raised position relative to said side supports.

5. The vehicle roof as defined in claim 4 wherein said side channels of said rear roof segment include drive means, said first drive means comprising longitudinal cylinders receiving a flexible cable, said cable actuably attached to said at least one lever of said side supports to selectively actuate said at least one lever and retract said side supports into said side channels.

6. The vehicle roof as defined in claim 4 wherein said raised levers travel through said upper longitudinal slot of said side channels upon retraction of said side supports into said side channels thereby maintaining said intermediate roof segment above said rear roof segment.

7. The vehicle roof as defined in claim 4 wherein said at least one pivotable levers of said side supports include means for preventing lowering of said intermediate roof segment until said side supports are fully extended into engagement with said front vehicle portion.

8. The vehicle roof as defined in claim 3 wherein said rear roof segment includes second drive means for retracting said rear roof segment and intermediate roof segment downwardly into the vehicle body, said means comprising a cylinder system having piston rods secured to said rear roof segment for retracting said rear roof segment.

9. The vehicle roof as defined in claim 8 wherein said rear roof segment has at least two side support arms extending laterally outwardly from said rear roof segment, said side support arms cooperating with guide tracks formed into the vehicle body to guide the movement of said rear roof segment into the vehicle body.

10. The vehicle roof as defined in claim 9 wherein said rear roof segment includes a pair of support arms extending from each side of said rear roof segment said support arms having a guide roller cooperating with said guide tracks.

11. The vehicle roof as defined in claim 10 wherein said guide tracks include locking means engageable with said support arms to secure said rear roof segment in the extended position.

12. The vehicle roof as defined in claim 4 wherein said at least one roof panel is selectively movable between a first closed position wherein said intermediate roof segment is fully extended into engagement with said fixed front portion and said intermediate roof segment is lowered onto said side supports to fully enclose the passenger compartment, a second vented position wherein the rearward end of said intermediate roof segment is raised upwardly by said pivotable levers, a third targa position wherein said side supports are retracted into said rear roof segment and said intermediate roof segment is positioned over said rear roof segment thereby exposing an intermediate portion of the passenger compartment, and a fourth convertible position wherein said intermediate roof segment and said rear rod segment are retracted into the vehicle body thereby exposing the entire passenger compartment, said vehicle roof being selectively movable through and between any of said roof positions.

13. A multi-position roof for a vehicle having a passenger compartment, said vehicle roof comprising:

at least one rigid roof panel having side supports and means for selectively retracting said at least one rigid roof panel rearwardly, said side supports telescopically retractable into the vehicle to retract said at least one rigid roof panel rearwardly exposing the passenger compartment.

14. The vehicle roof as defined in claim 13 wherein said at least one roof panel includes an intermediate roof segment attached to said side supports and a rear roof segment telescopically receiving said side supports to retract said intermediate roof segment onto said rear roof segment thereby exposing an intermediate portion of said passenger compartment.

15. The vehicle roof as defined in claim 14 wherein said rear roof segment includes side channels telescopically receiving said side supports of said intermediate roof segment, said side supports of said intermediate roof segment selectively telescoping into said side channels of said rear roof segment to move said vehicle roof to a targa position whereby said intermediate roof segment is juxtaposed adjacent said rear roof segment.

16. The vehicle roof as defined in claim 15 wherein said intermediate roof segment is attached to said side supports by a pair of selectively pivotable levers mounted to each of said side supports, said levers selectively moving said intermediate roof segment between a lowered position, a tilted venting position and a raised position relative to said side supports.

17. The vehicle roof as defined in claim 16 wherein said retracting means comprises cylinders formed in said side channels of said rear roof segment having a flexible cable telescopically received therein, said cable actuably attached to at least one lever on said side supports to selectively actuate said levers and to extend and retract said intermediate roof segment relative to said rear roof segment.

18. The vehicle roof as defined in claim 17 wherein said levers of said side supports include means for preventing lowering of said intermediate roof segment from said raised position until said side supports are fully extended into engagement with said front vehicle portion.

19. The vehicle roof as defined in claim 18 wherein said retracting means further comprises a cylinder system having piston rods secured to said rear roof segment for retracting said rear roof segment and said juxtaposed intermediate roof segment downwardly into the vehicle body to a convertible position exposing the entire passenger compartment.

20. The vehicle roof as defined in claim 19 wherein said rear roof segment has a plurality of side support arms cooperatingly engaging corresponding guide tracks formed in the vehicle body to guide the movement of said rear roof segment into the vehicle body.

21. A multi-position roof for a vehicle having a passenger compartment and a vehicle body, said vehicle roof comprising:
a fixed front position, an intermediate roof segment and a rear roof segment;
said roof movable between a coupe position wherein said intermediate roof segment engages said fixed front portion to enclose the passenger compartment and a convertible position exposing the passenger compartment wherein said intermediate roof segment and said rear roof segment telescopically retract into the vehicle body.

22. The vehicle roof as defined in claim 21 wherein said intermediate roof segment includes side supports telescopically retractable into side channels of said rear roof segment, said intermediate roof segment juxtaposed adjacent said rear roof segment upon retraction of said side supports into said channels whereby said roof is in a targa position exposing an intermediate portion of the passenger compartment.

23. The vehicle roof as defined in claim 22 wherein said side supports include selectively pivotable levers attached to said intermediate roof segment, said levers selectively moving said intermediate roof segment between said coupe position, a tilted venting position and a raised position to facilitate retraction of said intermediate roof segment to said juxtaposed targa position and a fourth convertible position wherein said intermediate roof segment and said rear roof segment are retracted into the vehicle body thereby exposing the entire passenger compartment.

24. The vehicle roof as defined in claim 23 further comprising first means for moving said intermediate roof segment between said coupe positions, said venting position and said targa position and second means for moving said rear roof segment and said intermediate roof segment between said targa position and said convertible position.

25. The vehicle roof as define in claim 24 wherein said first means includes a cylinder formed said side channels of said rear roof segment telescopically receiving a flexible cable, said cable secured to said pivotable levers of said side supports to selectively actuate said levers and selectively extend and retract said side support within said channels.

26. The vehicle roof as defined in claim 25 wherein said levers include means for preventing pivoting movement of said levers from said raised position until said side supports are fully extended into engagement with said fixed front portion.

27. The vehicle roof as defined in claim 24 wherein said roof is selectively movable between a first coupe position wherein said intermediate roof segment is fully extended into engagement with said fixed front portion to fully enclose the passenger compartment, a second vented position wherein the rearward edge of said intermediate roof segment is raised upwardly by said pivotable levers, a third targa position wherein said side supports are retracted into said rear roof segment and said intermediate roof segment is positioned over said rear roof segment thereby exposing an intermediate portion of the passenger compartment.

28. A multi-position roof for a vehicle having a passenger compartment and a vehicle body, said vehicle roof comprising:
a fixed front portion, an intermediate roof segment and a rear roof segment;
said roof movable between a coupe position wherein said intermediate roof segment engages said fixed front portion to enclose the passenger compartment and a targa position exposing the passenger compartment wherein said intermediate roof segment retracts into alignment with said rear roof segment, said intermediate roof segment including side supports rearwardly retracted upon retraction of said intermediate roof segment such that an intermediate portion of the passenger compartment is fully exposed.

29. The vehicle roof as defined in claim 28 wherein said intermediate roof segment retracts onto said rear roof segment, said aligned intermediate and rear roof segments expose the entire passenger compartment.

30. The vehicle roof as defined in claim 29 wherein said roof is selectively movable between a first coupe position wherein said intermediate roof segment is fully extended into engagement with said fixed front portion to enclose the passenger compartment, a second vented position wherein the rearward edge of said intermediate roof segment is raised upwardly, a third targa position wherein said intermediate roof segment is positioned over said rear roof segment thereby exposing an intermediate portion of the passenger compartment, and a fourth convertible position wherein said intermediate roof segment and said rear roof segment are retracted into the vehicle body thereby exposing the entire passenger compartment.

31. The vehicle roof as defined in claim 30 wherein said side supports of said intermediate roof segment are telescopically received within side channels of said rear roof segment, said intermediate roof segment juxtaposed adjacent said rear roof segment upon retraction of said side supports into said channels moving said roof into said third targa position.

32. The vehicle roof as defined in claim 31 wherein said side supports include selectively pivotable levers attached to said intermediate roof segment, said levers selectively moving said intermediate roof segment between said coupe position, said tilted venting position, and a raised position to facilitate retractions of said intermediate roof segment to said juxtaposed targa position.

33. The vehicle roof as defined in claim 32 wherein said pivotable levers mounted to said side supports include means for preventing pivoting movement of said levers from said raised position until said side supports are fully extended into engagement with said fixed front portion.

34. A multi-position roof for a vehicle having a passenger compartment and a vehicle body, said vehicle roof comprising:
a fixed front portion, an intermediate roof segment and a rear roof segment;
means for moving said intermediate roof segment between a coupe position wherein said intermediate roof segment is fully extended into engagement with said fixed front portion to enclose the passenger compartment, a vented position wherein the rearward edge of said intermediate roof segment is raised upwardly, and a targa position wherein said intermediate roof segment is juxtaposed over said rear roof segment thereby exposing an intermediate portion of the passenger compartment; and means for moving said rear roof segment and said juxtaposed intermediate roof segment between said targa position and a convertible position wherein said intermediate roof segment and said rear roof segment are retracted into the vehicle body thereby exposing the entire passenger compartment.

* * * * *